SOLUTION GROWTH OF NITROGEN DOPED GALLIUM PHOSPHIDE

Filed Nov. 21, 1966

INVENTORS R.T. LYNCH
D.G. THOMAS

BY David P. Kelley
ATTORNEY

United States Patent Office 3,462,320 Patented Aug. 19, 1969

3,462,320

SOLUTION GROWTH OF NITROGEN DOPED GALLIUM PHOSPHIDE

Robert T. Lynch, Berkeley Heights, and David G. Thomas, Summit, N.J., assignors to Bell Telephone Laboratories, Incorporated, Murray Hill, N.J., a corporation of New York Filed Nov. 21, 1966, Ser. No. 595,672
Int. Cl. H01 7/00
U.S. Cl. 148—171 4 Claims

ABSTRACT OF THE DISCLOSURE

Nitrogen doping of III–V compounds creates isoelectronic traps which function as radiative centers in junction devices. A method of making such devices is directed toward eliminating extraneous nitrogen and then preventing nitrogen contamination during crystal growth. Polycrystalline GaP is first deposited by passing phosphine gas over molten gallium. Thereafter a melt of said deposited GaP, and also GaN and Ga is formed. The melt is slowly cooled to deposit nitrogen doped single crystals.

This invention relates to techniques for the growth of compositions useful in electroluminescent devices and to such devices. More particularly the invention relates to a technique for the growth of nitrogen doped Group III–V semiconductive compositions, particularly nitrogen doped gallium phosphide.

The rapid and expanding development of many fields requiring optical displays or indicators, such as, for example, the computer and communication fields, has necessitated a search for new light emitting devices which are characterized by comparatively long life, intense illumination, reliability, and simplicity. Various semiconductor electroluminescent devices give promise of being satisfactory in the above enumerated desiderata.

Recently, there has been an interest in a class of junction devices which exhibit what are known as "isoelectronic traps," that function as radiative centers, thereby causing luminescence at the junction upon application of an electric field. There has been speculation as to the exact nature of these traps, but it is generally considered that they are impurity centers which manifest the characteristic of binding a hole and an electron with a finite energy, even though they themselves possess neither a net charge nor a bound hole or electron, and which are capable of providing a path for the radiative recombination of the trapped hole and electron.

In accordance with the present invention, techniques are described for the growth of nitrogen doped Group III–V materials, more particularly, gallium phosphide in which the nitrogen concentration ranges between $10^{16}$ to $10^{19}$ atoms per cubic centimeter. Such materials, where incorporated into a two-terminal p-n junction device, emit green light at room temperature upon application of about 2 volts. The techniques to be described have in common the reduction or elimination of residual nitrogen concentrations in the materials which are used in making the crystals, and in finally growing the crystals under controlled conditions to prevent nitrogen contamination.

The invention will be more readily understood by reference to the following detailed description, read in conjunction with the accompanying drawings, in which:

FIG. 1A depicts a nitrogen doped gallium phosphide crystal 11 prepared by the method of the invention.

In making crystal 11, it is necessary to prevent nitrogen contamination, and, prior to the doping steps, to eliminate extraneous nitrogen from the constituent materials from which the crystal is grown. If the nitrogen contamination is suppressed or eliminated, the concentration of nitrogen in the crysal 11 bears a substanially linear relationship to the amount of dopant added during the crystal growth process. On the other hand, the final nitrogen concentration with contamination present is not a linear function of the dopant and hence cannot be predicted with any degree of accuracy. The present invention is directed to achieving and maintaining a substantially linear relationship between the dopant added and the final nitrogen concentration. To this end, an alumina boat containing gallium is held in a temperature gradient near 1100° C. in a furnace having an alumina liner while phospine gas ($PH_3$) diluted in hydrogen is passed over it. The temperature gradient is preferably 250° C. to 1100° C. Under these conditions, the phosphorus enters the solution in the hot region and GaP deposits in the cool region without forming an impenetrable skin. In this manner, all of the gallium is converted to a polycrystalline mass of GaP that is substantially free of nitrogen contamination, i.e., a nitrogen concentration of less than $2\times10^{15}$/cc. The GaP thus produced is to be used as the charge in growing crystal 11.

Figure 2:
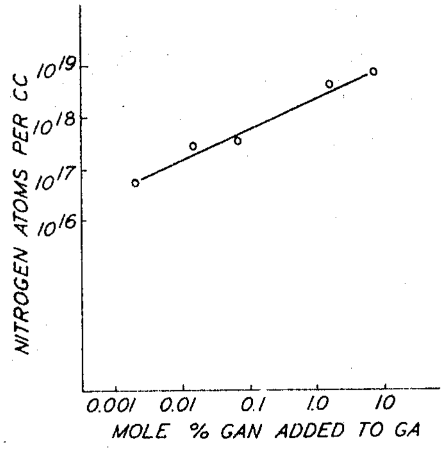
FIG. 2 is a chart of the relationship of dopant material to final impurity concentration.

Gallium is heated to approximately 1100° C. in a vacuum for a period of from one to two hours and then the GaP prepared as dsecribed heretofore is introduced without exposing the gallium solution to air. The ratio of Ga to GaP is typically ten to one. At the same time, the GaN is added in an amount determined by the final nitrogen concentration desired. In FIG. 2 there is shown the substantailly linear relationship between the amount of GaN added and the final nitrogen concentration when the method of the present invention is followed.

The solution of Ga, GaP, and GaN is sealed in a quartz ampoule and heated to 1200° C., then cooled from 1200° C. to 800° C. over a period of about ten hours. Irregularly shaped single crystals are then extracted from the gallium by washing in concentrated hydrochloric acid, after which they are cut to size and shape and polished.

It will be appreciated that any of the well-known donors may be added with the gallium phosphide, for example, tellurium, sulphur, selenium, and the like, in order to control the conductivity type of the resultant crystal. As described herein, the procedure is directed to the preparation of n-type crystals, but p-type crystals can also be made by addition of the proper material.

The gallium nitride that is added to the melt can be prepared in any of several ways; however, it has been found that an efficacious method is to flow $NH_3$ (ammonia) at approximately one atmosphere over $Ga_2O_3$ at a temperature of approximately 800° C. for several hours.

A suitable crystal having been prepared, the next step is to prepare at two-terminal junction device.

Figure 1A:
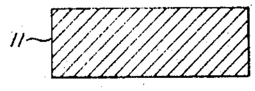
FIGS. 1A through 1C are cross-sectional views in successive stages of manufacture of an electroluminescent junction device of the present invention.
Figure 1B:
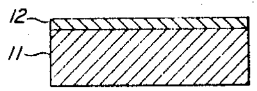

The crystal 11 is first prepared by etching in aqua regia for 10 to 15 seconds to decrease and clean the surfaces. Next a thin p-type GaP layer 12 is deposited on one surface of the crystal 11, such as the top surface as shown in FIG. 1B. While the p-type layer may be deposited by a number of suitable techniques, it has been found that high quality p-n- junctions can be obtained by using substantially the same technique shown and described in the copending United States patent application Ser. No. 556,192, of D. L. Klein and K. L. Lawley, filed June 8, 1966. In adapting that technique to the materials of the present invention, a solution of GaP with zinc, contained in a boat with crystal 11 at a temperature of 1000° C. is tipped onto crystal 11 so that the top surface is covered thereby, cooled, and tipped off, leaving a thin p-type epitaxial layer on the n-type GaP substrate.

Figure 1C:
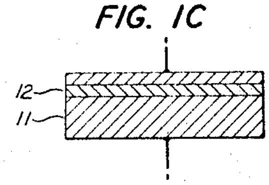

As a final step, the p-n junction device of FIG. 1B is cleaned and contacts are affixed to the p and n regions by any suitable means, resulting in the two-terminal p-n junction device of FIG. 1C.

The foregoing method of producing nitrogen doped crystals of III–V material, such as gallium phosphide, is illustrative of the principle of the invention. It is to be understood that various changes or modifications may be made by workers skilled in the art without departure from the spirit and scope of the invention.

What is claimed is:

1. A method for making a nitrogen doped material for use in a p-n junction device comprising the steps of producing polycrystalline GaP by maintaining gallium in a temperature gradient of approximately 850° C. to 1100° C. while passing phosphine gas over the gallium, whereby phosphorus enters the gallium in the hot region and polycrystalline gallium phosphide deposits in the cool region without forming an inpenetrable skin, preheating gallium in vacuum at approximately 1100° C. for one to two hours, adding said deposited GaP to the gallium without exposure to air in a ratio of approximately one to ten and adding a predetermined amount of GaN, sealing the solution and heating to 1200° C. then cooling to 800° C. over a period of approximately ten hours, and extracting the nitrogen doped GaP single crystals thus formed from the solution.

2. A method as claimed in claim 1 wherein the gallium in the temperature gradient is contained in an alumina boat and heated in a furnace having an alumina liner.

3. A method for making a p-n junction device comprising the steps of producing polycrystalline GaP by maintaining gallium in a temperature gradient of approximately 850° C. to 1100° C. while passing phosphine gas over the gallium, whereby phosphorus enters the gallium in the hot region and polycrystalline gallium phosphide deposits in the cool region without forming an inpenetrable skin, preheating gallium in vacuum at approximately 1100° C. for one to two hours, adding said deposited GaP to the gallium without exposing to air in a ratio of approximately one to ten and adding a predetermined amount of GaN, sealing the solution and heating to 1200° C. then cooling to 800° C. over a period of approximately ten hours, extracting the nitrogen doped GaP single crystals thus formed and cutting to size, forming an opposite conductivity layer on at least one surface of at least one of said nitrogen doped GaP single crystals, cleaning and affixing contacts to two surfaces of opposite conductivity type.

4. A method for making monocrystalline nitrogen doped gallium phosphide comprising the steps of first producing substantially nitrogen free polycrystalline gallium phosphide by passing phosphine gas over molten gallium kept in a temperature gradient whereby phosphorous enters the gallium in the hot region and polycrystalline gallium phosphide deposits in the cool region without forming an impenetrable skin, thereafter forming a melt of said deposited polycrystalline gallium phosphide, gallium nitride, and gallium, slowly cooling the melt whereby single crystals of nitrogen doped gallium phosphide are formed in the ingot, and recovering said single crystals from the ingot.

References Cited

UNITED STATES PATENTS

| | | | |
|---|---|---|---|
| 3,277.006 | 10/1966 | Johnson et al. ---- | 148—175 XR |
| 3,278,342 | 10/1966 | John et al. ---------- | 148—1.6 |
| 3,346,414 | 10/1967 | Ellis et al. ---------- | 117—106 |
| 3,411,946 | 11/1968 | Tramposch --------- | 117—201 |

OTHER REFERENCES

Nelson, H.: R.C.A. Review, December 1963, pp. 603–615.

L. DEWAYNE RUTLEDGE, Primary Examiner

PAUL WEINSTEIN, Assistant Examiner

U.S. Cl. X.R.

23—204, 301; 117—106, 201; 148—1.6, 172, 173, 175, 177; 255—67.3